Jan. 9, 1968

H. PURRE 3,362,474

OIL PRODUCTION BY AQUEOUS FLUID DRIVE USING
A NON-IONIC SURFACTANT

Filed Aug. 23, 1965

SATURATION–HIGH

SATURATION–MEDIUM

SATURATION–LOW

INVENTOR
HEINO PURRE
BY Young & Quigg
ATTORNEYS

United States Patent Office 3,362,474
Patented Jan. 9, 1968

3,362,474
OIL PRODUCTION BY AQUEOUS FLUID DRIVE USING A NON-IONIC SURFACTANT
Heino Purre, Bartlesville, Okla., assignor to Phillips Petroleum Company, a corporation of Delaware
Filed Aug. 23, 1965, Ser. No. 481,512
8 Claims. (Cl. 166—9)

ABSTRACT OF THE DISCLOSURE

Oil is produced by aqueous fluid drive in larger percentages of in-place oil than conventionally produced by this type of drive by depositing an aqueous slug of a non-ionic surfactant of the formula R—R'—R"—OH wherein R is an aliphatic alkyl of 9 to 20 carbon atoms having 0 to 4 methyl branches, R' is O or S, and R" is polyethylene oxide of an average of 4.5 to 6 units, in an amount in the range of 0.00025 to 0.01 pore volume and driving the slug thru the stratum toward an offset production well to produce oil therein.

---

Figure 1:
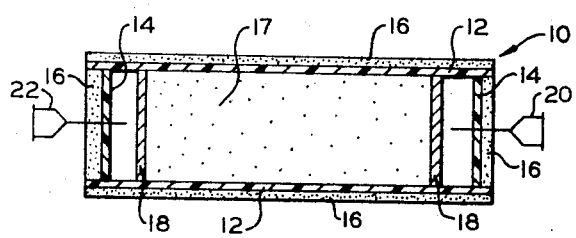

This invention relates to a process for producing oil from an oil-bearing stratum by aqueous fluid drive.

The production of oil by aqueous fluid drive such as water flooding and steam flooding is an accepted technique in the petroleum industry. However, water flooding as a secondary recovery method still leaves a substantial proportion of the oil in the formation and this oil is substantially unrecoverable by water flooding. Steam drive also leaves unrecoverable oil in the reservoir but is generally more effective than water flooding. Various types of surfactants have been injected into the oil-bearing strata with or in advance of the aqueous flooding medium in order to improve the recovery of oil. Some of the additives have increased the efficiency of the aqueous fluid drive but still leave much to be desired in the way of improved recovery.

This invention is concerned with the use of specific surfactants in aqueous fluid drive which are more effective than any heretofore used.

Accordingly, it is an object of the invention to provide an improved aqueous fluid drive process for the production of oil which utilizes effective surfactants. Another object is to provide an oil production process using aqueous fluid drive which is more efficient in producing oil than processes known up to the present time. A further object is to provide an oil production process by aqueous fluid drive which ensures the changing of an oil-bearing stratum which is oil-wet to one which is water-wet. Other objects of the invention will become apparent to one skilled in the art upon consideration of the accompanying disclosure.

A broad aspect of the invention comprises depositing in an oil-bearing stratum around a well therein a slug of a non-ionic surfactant of a specific type and thereafter injecting water thru the well so as to drive the slug of aqueous surfactant solution thru the stratum toward an offset well and displace oil from the stratum into the offset wall, and recovering the displaced oil from the offset well. The surfactant required in the invention has the formula R—R'—R"—OH wherein R is an alipltic alkyl of 9–20 carbon atoms having 0 to 4 methyl branches, R' is O or S, and R" is a polyethylene oxide of an average of 4.5 to 6 units. The amount of the surfactant deposited in the stratum in aqueous solution is the range of 0.0025 to 0.01 pore volume of the stratum to be swept by the fluid drive. The aqueous solution may be formed above ground and injected thru the well tubing into the stratum and this is the preferred mode of operation. However, where the stratum contains connate water it is feasible to inject the liquid surfactant in concentrated form into the connate water surrounding the injection well and follow this with injection of flood water or steam.

Where the surfactant is admixed with water prior to injection, a concentration of the surfactant in the water in the range of 0.05 to 1 weight percent is preferred. Sufficient slug of surfactant is injected to permeate a substantial annulus of the stratum surrounding the injection well such as at least 2′ and up to 8 or 10′ or more in width or radius.

Tests were run on 335 surfactants to determine the capacity thereof for oil displacement in a typical oil sand. Of all of these agents tested, only 11 had the capacity for displacing oil in this oil sand. Of the 11 screened out, some had marginal effect in displacing oil. The effective surfactants all belong to the non-ionic polyoxyethylene ether and thioether families. The length of the ethylene oxide chain in the hydrophilic end is in the range of 4.5 to 6 moles with one terminal OH group. The hydrophobic end (radical) of the molecule varies widely but is a straight chain aliphatic hydrocarbon with 0 to 4 methyl branches. The ether oxygen link may be replaced by the thioether link.

In testing the surfactants, a solution thereof was made in simulated Burbank (Okla.) produced brine with the following salt content: 40 grams per liter of NaCl, 10.5 grams per liter of $CaCl_2$, and 4.8 grams per liter of $MgCl_2 \cdot 6H_2O$. A concentration of the surfactant of 1 percent by weight was used. The crude oil was obtained from Burbank water flood production from a well presumed to have been free of treating chemicals. It was centrifuged to remove fine solids such as paraffin and inorganic impurities. Oil soluble surfactants were dissolved in crude oil at a concentration of 1 percent by weight. The specific gravity of the oil was 0.835 at 78° F. or 38 API and the viscosity was 6.8 cp. at this temperature.

The sand used in the test was obtained from Burbank cores by disintegration and separating the oil-wet part by froth flotation. The native crude oil was used in the froth flotation as collector and frother. This was necessary because crushing the standstone reduces the oil-wet properties markedly. The particle size of the sand used for the tests was a 250 to 300 micron fraction.

Figure 2:
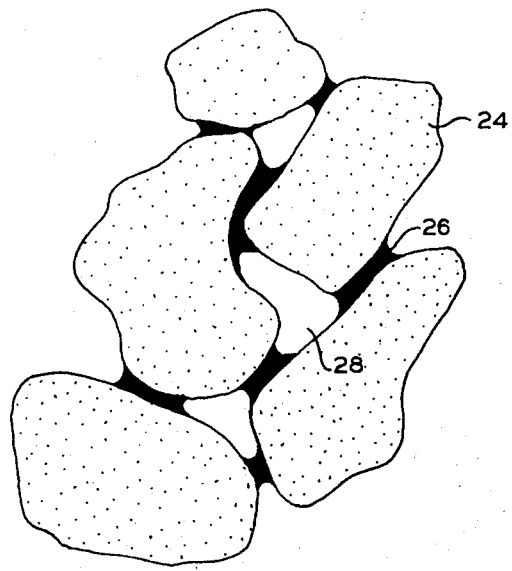
Figure 4:
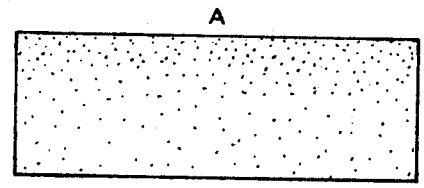
Figure 4:
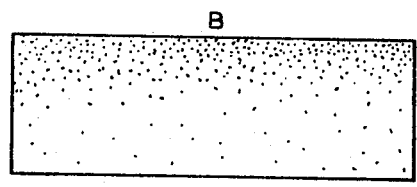
Figure 4:
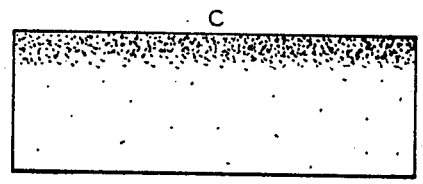
Figure 3:
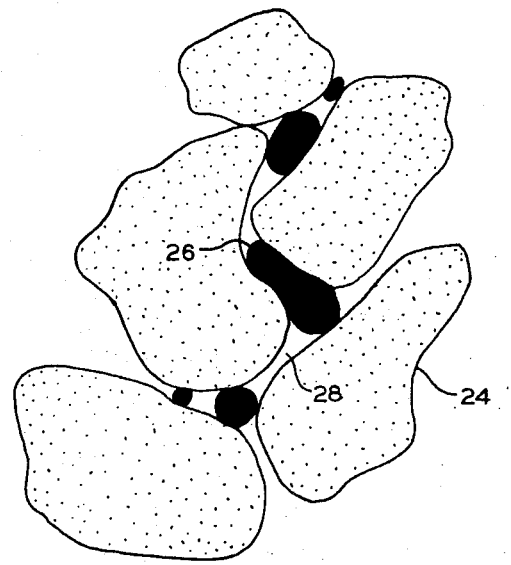

A more complete understanding of the invention may be had by reference to the accompanying schematic drawing of which FIGURE 1 is a plan view in cross section of a microcell for testing the invention; FIGURE 2 is an enlarged view of oil-wet sand grains and entrapped water in the device of FIGURE 1; FIGURE 3 is a similar view to FIGURE 2 of water-wet sand grains and entrapped oil globules; and FIGURE 4 is a representation of oil saturation conditions in the sand of the test device during testing.

The tests were conducted in microcells shown in FIGURE 1 of the drawing which is a plan view of a microcell 10 consisting of a pair of spaced apart standard 3″ x 1″ glass slides by spacers 12 and 14 of 15 mils thickness and $\frac{1}{16}$″ wide, thus spacing the slides 15 mils apart. The slides were glued together at the edges by epoxy resin 16 to seal the microcell. The 15 mil space between the slides and between spacers 18 was filled with the Burbank oil-wet sand 17. Bars 18 which are 10 mils thick were positioned at both ends of the sand to provide uniform flow over the cross section of the microcell. The pore volume of the cells was approximately 0.5 cc. Hypodermic needles 20 and 22 were injected thru opposite ends of the cell to provide for ingress and egress, respectively, of fluid.

The dry oil-wet stand in the microcell was flooded with crude oil and the oil was left in contact with the sand for at least 1 hour. Then the microcell was water flooded with 3 cc. (6 pore volumes) of brine. Under the microscope the fluid distribution at residual saturation has the appearance shown schematically in FIGURE 2 which shows the sand grains 24 with oil 26 wetting the grains and trapping water 28. Immediately after water flooding, the brine solution of the surfactant was injected and the initial production, if any, of oil was estimated in tenths of all residual oil after water flooding. The change of wettability was also observed qualitatively in terms of the change of wetting angle. The water-wet state under the microscope is shown schematically in FIGURE 3 in which sand grains 24 are wet by water 28 and oil globules 26 are suspended in the water.

The microcell was placed on its edge for 24 hours and then the degree of segregation was observed qualitatively as characterized by the appearance of the lower half of the cell. Thus, unchanged saturation in the lower half of the cell corresponds to no segregation and very low saturation corresponds to a high degree of segregation. These conditions are illustrated in FIGURE 4 where the density of dots indicates oil saturation. After 24 hours the sand was again flooded with 3 cc. of brine and the wetting properties and production of crude were observed and recorded. All of the observations in the microcells were made under the microscope.

The result of the microcell tests are presented in the table below:

| Test No. | Surfactant | Average Mols Ethylene | Initial Production | 24 hr. Seg. | Segregation Saturation | 48 hr. | Production | Rating |
|---|---|---|---|---|---|---|---|---|
| 233 | Tall oil ethylene oxide | 6 | .5 water wet | + | Low | .4 | Water wet | Very good. |
| 224 | ____do____ | 8 | .3 neutral | + | Medium | .3 | ____do____ | Fair. |
| 80 | ____do____ | 12 | .1 oil wet | 0 | High | 0 | Oil wet | Poor. |
| 124 | Lauryl alcohol ethylene oxide | 1 | 0 oil wet | 0 | ____do____ | 0 | ____do____ | Do. |
| 125 | ____do____ | 4.5 | ____do____ | + | Low | .8 | Water wet | Good. |
| 192 | Oxyethylated dodecyl mercaptan | 1 | .2 oil wet | + | High | .1 | Neutral | Poor. |
| 187 | Polyoxyethylene thioether | 5 | .5 water wet | + | Low | .3 | Water wet | Good. |
| 190 | Polyoxyethylene thioether, 60% | 5 | ____do____ | + | ____do____ | .4 | ____do____ | Very good. |
| 112 | Polyoxyethylene lauryl ether | 23 | .1 oil wet | 0 | High | 0 | Oil wet | Poor. |
| 111 | ____do____ | 4.5 | .3 oil wet | + | Low | .4 | Water wet | Good. |

In column 4, initial production is given along with the wettable nature of the sand. In column 5, the 24 hour segregation condition is indicated. The plus indicates segregation, no matter how small. In column 6, the residual saturation is indicated as high, low, or medium which is shown schematically in slides A, B, and C of FIGURE 4, the density of dots indicating oil saturation. In column 7, the production is given resulting from the flooding with brine. Column 8 indicates the wetting properties at the final production step.

To illustrate the invention as demonstrated by the table of test data tall oil ethylene oxide in test No. 233 initially produced .5 or ½ of the in-place oil and .4 of the oil at the 48 hour production step. This indicates a production of .9 of the oil utilizing the method of the invention. Test 190 showed comparable production for polyoxyethylene thioether at 60 percent concentration in the original product. It was not known what the diluent was and this could not be learned. The polyoxyethylene thioether without diluent is almost as efficient as illustrated in test No. 187.

Certain modifications of the invention will become apparent to those skilled in the art and the illustrative details disclosed are not to be construed as imposing unnecessary limitations on the invention.

I claim:
1. A process for producing oil from an oil-bearing stratum by fluid drive which comprises the steps of:
    (1) depositing in said stratum thru a well therein an aqueous slug of a non-nonic surfactant having the formula R—R'—R"—OH wherein R is an aliphatic alkyl of 9 to 20 carbon atoms having 0 to 4 methyl branches, R' is O or S, and R" is polyethylene oxide of an average of 4.5 to 6 units, in an amount in the range of 0.0025 to 0.01 pore volume of the stratum to be swept by the fluid drive;
    (2) thereafter, injecting aqueous driving medium thru said well into said stratum so as to drive aqueous surfactant solution thru said stratum toward an offset well and displace oil therefrom into said offset well; and
    (3) recovering displaced oil from said offset well.
2. The process of claim 1 wherein said surfactant is admixed with water in a concentration of 0.05 to 1 weight percent to form a solution thereof and said solution is injected as the slug in step (1).
3. The process of claim 1 wherein said stratum contains connate water and a solution of said surfactant in said connate water is made before driving same thru said stratum with flood water.
4. The process of claim 1 wherein said surfactant is tall oil ethylene oxide.
5. The process of claim 1 wherein said surfactant is lauryl alcohol ethylene oxide.
6. The process of claim 1 wherein said surfactant is polyethylene lauryl ether.
7. A process for producing oil from an oil-bearing stratum penetrated by an injection well and an offset production well by aqueous drive which comprises the steps of:
    (1) injecting into said stratum thru said injection well an aqueous slug of a non-ionic surfactant having the formula R—S—R"—OH wherein R is an aliphatic alkyl of 9 to 20 carbon atoms having 0 to 4 methyl branches and R" is polyethylene oxide of an average of 4.5 to 6 units, in a concentration in said slug in the range of 0.05 to 1 weight percent so as to permeate an annulus around said injection well extending at least 2 feet radially therefrom;
    (2) thereafter, injecting aqueous driving medium into said stratum thru said injection well so as to drive said slug toward said production well and displace oil into same; and
    (3) recovering oil from said production well.
8. The process of claim 7 wherein said surfactant is polyethylene thioether.

References Cited

UNITED STATES PATENTS

| 3,006,411 | 10/1961 | Holbrook | 166—9 |
| 3,033,889 | 5/1962 | Chiddix et al. | 252—8.55 |
| 3,100,524 | 8/1963 | Beeson | 166—9 |
| 3,131,759 | 5/1964 | Slusser et al. | 166—9 X |
| 3,288,213 | 11/1966 | King et al. | 166—9 |

STEPHEN J. NOVOSAD, *Primary Examiner.*